Sept. 20, 1966     R. L. MOORE     3,273,767
LUGGAGE RACK

Filed Feb. 24, 1965     2 Sheets-Sheet 1

FIG. I.

INVENTOR.

ROBERT L. MOORE

Sept. 20, 1966  R. L. MOORE  3,273,767
LUGGAGE RACK

Filed Feb. 24, 1965  2 Sheets-Sheet 2

INVENTOR
Robert L. Moore

3,273,767
LUGGAGE RACK
Robert L. Moore, Orange County, Fla.
(7100 Autumvale Drive, Orlando, Fla.)
Filed Feb. 24, 1965, Ser. No. 434,952
1 Claim. (Cl. 224—42.01)

This invention relates to a luggage rack to be used on the Volkswagen automobile and more particularly to a rack mounted between the rear bumper and the air intake grill of said automobile.

It is an object of this invention to provide an easily produced, low cost, light weight luggage rack which can be easily attached to or removed from the Volkswagen automobile without the use of tools.

Another object of this invention is to provide a rack, with luggage attached, which can be located on the rear of a Volkswagen automobile so as not to significantly increase wind resistance and gasoline consumption, and located also in a position so as not to appreciably obstruct vision through the rear window.

Still another object of this invention is to provide a luggage rack which can be quickly removed, with luggage attached, or partially removed, by releasing the top clamp assemblies and rotated about the tubular part of the Volkswagen bumper to provide access to the rear engine compartment.

Still additional objects, benefits, and advantages of this invention will become evident from a study of the following description taken in conjunction with the accompanying drawings in which.

Figure 1:
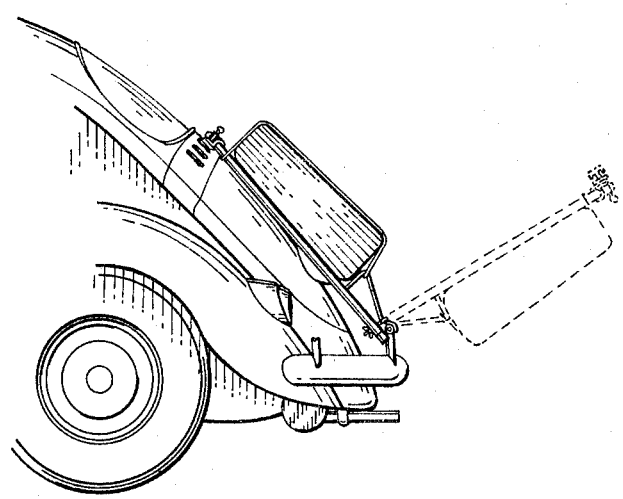
FIGURE 1 is a side view of the Volkswagen with the luggage rack and luggage shown in a normal locked on position. The dash lines show the luggage rack when rotated to permit access to the engine compartment.
Figure 2:
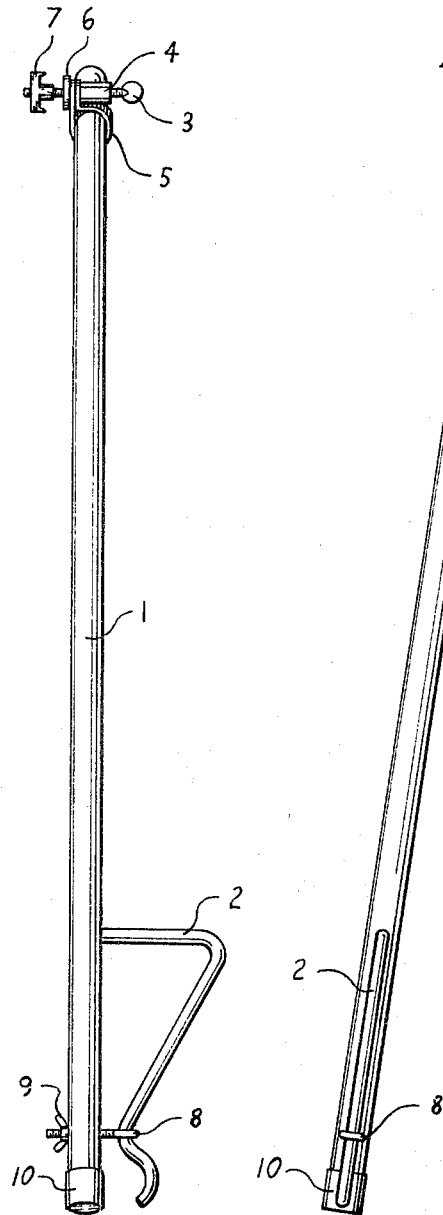
FIGURE 2 is a larger scale side view of the luggage rack shown in FIGURE 1.
Figure 3:
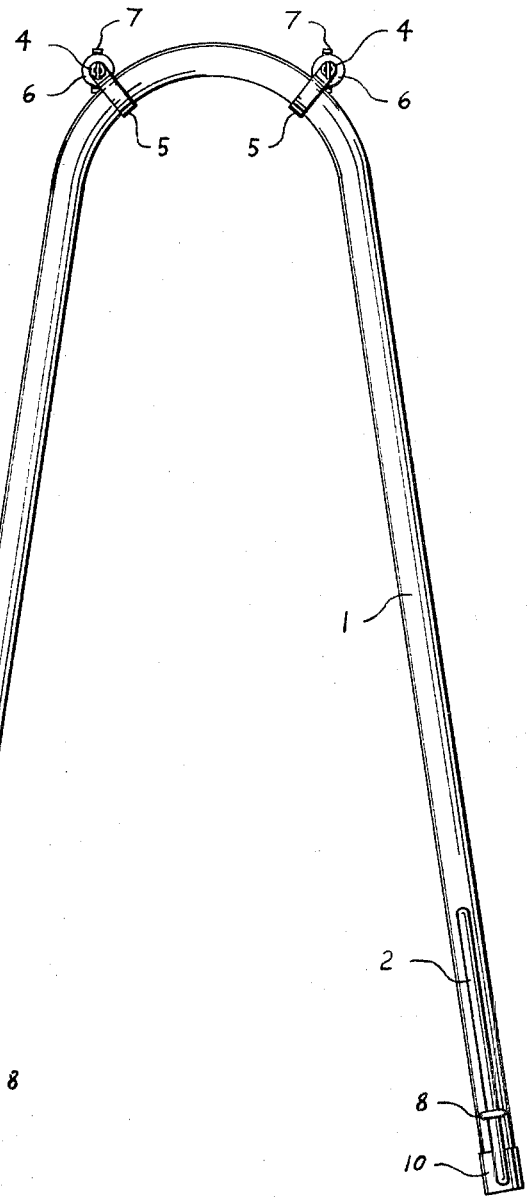
FIGURE 3 is a face view of the luggage rack projected from FIGURE 2.

Referring now specifically to the drawing, the luggage rack locks onto the Volkswagen bumper by first supporting the lower ends of the rack on the tubular section of the bumper so that the bumper lies between the plastic end caps 10 and the plastic covered wire form 2. A firm lock on the bumper is then obtained by pulling the wire form 2 toward the end on the tubular frame 1 by tightening wing nut 9 on eye bolt 8. The upper part of the wire form 2 forms the shelf on which luggage is supported and a loop through which rope may pass to tie luggage to the rack. When the luggage rack is removed from the Volkswagen, the end caps 10 serve as resting or support points. The frame 1 is a metal tube formed into a single loop at the top which may be used as a handle when the rack is removed from the automobile.

To support the top end of the luggage rack, hook nut 7, which is locked to thumb screw 3, is inserted into one of the engine air intake grill slots on the automobile; then thumb screw 3 is rotated 90 degrees so as to catch the hook nut 7 on the under side of the grill. Locking nut 4 is then turned on thumb screw 3 so as to close tube clamp 5 and pull it and the plastic faced washer 6 firmly against the grill. Luggage may be tied to the rack either prior to or after installation of the rack on the Volkswagen.

Quick access to the engine compartment is obtained by loosening wing nut 9, backing off locking nut 4, and rotating thumb screw 3 90 degrees to release the top of the rack which then may be swung back as shown in FIGURE 1.

While this invention has been described with particular reference to the construction shown in the drawings and while various changes may be made in the detail construction, it shall be understood that such changes shall be within the spirit and scope of the present invention as defined by the appended claim.

Having thus completely and fully described the invention what is now claimed as new and desired to be protected by Letters Patent of the United States is:

A detachable luggage rack for a Volkswagen vehicle comprising; an inverted U-shaped tubular element having divergent legs having no interconnection other than the bight of the U-shaped element, support means on each leg extending at right angles thereto to mount luggage thereon, clamping means at the end of each leg to clamp the legs to the tubular section of the Volkswagen bumper, attachment means at the bight of the U-shaped member to secure it to an air-intake grill of the Volkswagen, said clamping means upon partial unclamping also serving as a pivotal connection of the rack about the tubular section of the bumper to permit opening of the underlying vehicle door and access to the interior, said bight portion also serving as a handle means for hand carrying the rack upon removing said rack from the vehicle.

References Cited by the Examiner

UNITED STATES PATENTS

| 2,907,483 | 10/1959 | Prag | 224—42.03 |
| 3,203,605 | 8/1965 | Karl | 224—42.07 |

FOREIGN PATENTS

| 195,272 | 1/1958 | Austria. |
| 159,099 | 6/1957 | Sweden. |

GERALD M. FORLENZA, *Primary Examiner.*

J. OLDS, *Assistant Examiner.*